United States Patent [19]

Mori et al.

[11] 3,915,953

[45] Oct. 28, 1975

[54] METHOD FOR PREPARATION OF AZO COMPOUNDS UTILIZING THIOUREA AS A COUPLING PROMOTER

[75] Inventors: Satoshi Mori, Yono; Setsuzo Takahashi; Toru Tabei, both of Omiya; Tadashi Esumi, Tokyo; Yasuhiko Arisaka, Yono, all of Japan

[73] Assignee: Nippon Kayaku Kabushiki Kaisha, Tokyo, Japan

[22] Filed: Apr. 16, 1973

[21] Appl. No.: 351,644

[30] Foreign Application Priority Data
Apr. 17, 1972 Japan.............................. 47-37777

[52] U.S. Cl. ............... 260/171; 260/144; 260/196; 260/198; 260/199

[51] Int. Cl.$^2$.......................................... C09B 41/00
[58] Field of Search ........... 260/169, 170, 171, 172, 260/173, 196, 198, 199, 205, 144

[56] References Cited
UNITED STATES PATENTS
3,405,116   10/1968   Ischer ................................. 260/144
3,406,161   10/1968   Dore et al. ...................... 260/170 X

*Primary Examiner*—Charles F. Warren
*Attorney, Agent, or Firm*—Lane, Aitken, Dunner & Ziems

[57] ABSTRACT

A method for the preparation of an azo compound with high purity and yield is disclosed wherein a diazo compound or a tetrazo compound is coupled with a coupling component in the presence of thiourea.

5 Claims, No Drawings

METHOD FOR PREPARATION OF AZO COMPOUNDS UTILIZING THIOUREA AS A COUPLING PROMOTER

BACKGROUND OF THE INVENTION

This invention relates to a method for the preparation of an azo compound.

A coupling promoter, such as pyridine, a derivative of pyridine, or urea, is generally used in methods for the preparation of an azo compound which involve the coupling of a diazotized or tetrazotized amine with a coupling component. Pyridine, derivatives thereof, and urea have effectively been used in a variety of coupling reactions. Pyridine and pyridine derivatives are particularly effective in coupling reactions conducted in an alkaline medium, while urea is effective for promoting coupling reactions conducted both in acidic mediums and in alkaline mediums.

Pyridine and its derivatives thereof are relatively expensive and emit offensive odors, which characteristics make these compounds undesirable for general use.

Because pyridine and its derivatives are detrimental to health, they should be removed from the final dye product. However, purification processes for the removal of pyridine and its derivatives must be conducted with care to avoid any deleterious effects on the product.

The use of urea as a coupling promoter has a disadvantage in that excessively large amounts must be employed, i.e., 700 parts by weight per 28 parts of the coupling component (see Example 2 of Japanese Pat. publication No. 5865/1967 issued Mar. 18, 1967 to Sandoz, A. G. and entitled "Manufacture of Azo Dyes"). The use of such large amounts results in high production costs and in various operational problems when applied in commercial manufacturing processes. After completion of a urea promoted coupling reaction, the azo product remains dissolved due to the solubilizing effect of the urea, so that complicated processes are often required to crystallize and separate the azo product. Moreover, when the final coupling-reaction solution is heated in an alkaline state, prior to the salting-out and filtration steps, ammonia is produced due to the decomposition of urea and emanates as an intense offensive odor, thus worsening working conditions. On the other hand, where the final solution is subjected to a salting-out step without heating or where the solution is heated under acidic conditions before the salting-out salt, the speed of filtration is significantly lowered.

The precipitate is obtained in the form of a pressed cake where filtered out of alkaline urea containing solutions. The precipitate has a greater caking tendency than that obtained without using urea. Where the filter cake is dried using an agitation type vacuum dryer, the cake solidifies in the form of a large block during the drying process. On the other hand, where the cake is dried under normal pressure, the urea decomposes and generates ammonia, which may in turn decompose the dye product under certain circumstances. Accordingly, drying parameters, such as temperature, time, etc., must be controlled so as to avoid decomposition of the dye product.

When the urea concentration in the final coupling-reaction solution is 20% by weight and the water-content of the pressed filter cake is 50% by weight, the urea content in the dried dye product reaches 20% by weight. If urea is present in the dye product in the amount of 5–10% by weight, the dye product absorbs moisture and may become partially solidified due to the hygroscopicity of the urea, thus causing serious problems in quality control.

The monoazo compounds produced by the process of the present invention can be converted to important dye intermediates by hydrolyzing an acetyl group of the compounds in an acidic or alkaline medium. These intermediates have been conventionally produced by coupling diazotized 4-nitroaniline with 1-amino-8-hydroxynaphthalene-3,6-disulfonic acid to give a monoazo compound, and reducing the nitro groups of the monoazo compound with sodium sulfide or sodium hydrosulfide. However, the conventional method has disadvantages in that the waste water resulting from the production of the monoazo compound contains noxious components, and a high purity monoazo compound cannot be obtained.

Recently, waste water, etc., emitted from industrial plants has been made subject to strict regulations to prevent environmental pollution. The method of the present invention is considered to represent a significant advance toward the elimination of the above-described pollution problems.

SUMMARY OF THE PRESENT INVENTION

It has now been discovered that when thiourea or a salt or derivative thereof is used as a coupling promoter, the above-described disadvantages connected with the prior art coupling promoters are effectively overcome. An aminohydroxynaphthalenesulfonic acid such as 1-amino-8-hydroxynaphthalene-3,6-disulfonic acid couples in the ortho position with respect to the amino group almost quantitatively with a weakly polarized diazo or tetrazo compound such as tetrazotized 4,4'-diamino-3,3'-dimethyl-1,1'-diphenyl when reacted in an acidic solution containing thiourea for 6–7 hours. Coupling reactions in alkaline mediums are also effectively promoted by the addition of thiourea.

Where the coupling process is conducted without using thiourea, the reaction requires a time longer than 15 hours and gives a lower yield of azo product which is also of lower quality.

The present process involves forming a first phase of a diazonium (or tetrazonium etc.) solution or suspension and adding thereto a second phase containing a coupling component which may also be in solution or suspension. The thiourea may be added at any time to either phase or to the phase mixture. Due to the tendency of diazonium salt solutions to decompose by the action of heat and light, it is preferred to use a freshly prepared diazonium solution for the coupling reaction.

The coupling components or reactants employed in the present invention are conventional and include all compounds which couple with diazonium or tetrazonium salts to form azo dyes or dye intermediates. Suitable coupling components include, for example, phenolic compounds and aromatic primary amines, including naphthylamines, and aminonaphthol sulfonic acids.

The reaction may be advantageously carried out in the presence of an organic or inorganic acid, an organic or inorganic base, or a solvent such as methanol, ethylene, glycol, dimethylformamide, etc. It is preferred to use a stabilizer for the diazo compound or tetrazo compound such as naphthalene-2-sulfonic acid, xylenesulfonic acid, p-toluenesulfonic acid, etc.

The thiourea may be used in extremely small amounts, i.e., 0.2 to 10% by weight of the coupling solution, as compared the amounts of urea required for use as a promoter, and its effectiveness as a promoter is at least equal to that obtained using urea. Moreover, thiourea though expensive as compared to urea, can be used in such a small amount as to allow a savings in the cost of the coupling promoter, and thiourea does not require any special apparatus for handling and addition. In addition, the various process problems which result from the use of large amounts of urea are avoided. The azo dye obtained or a complex metal salt thereof containing a metal such as copper, cobalt, nickel or chromium may be separated by a conventional method, e.g., the solution or dispersion is neutralized, if necessary, and filtered. The resultant dye is washed, if required, and dried. The dye products formed in the process of the present invention find utility in dyeing natural and regenerated cellulosic materials such as cotton, flax, linen, viscose and in dyeing staple fiber such as paper, wool, silk, synthetic polyamides and leather.

The following examples are intended to be illustrative only, and are not intended to limit the scope of the present invention as defined by the appended claims. The term "parts" used in the examples refers to parts by weight, and the percentages given are percentages by weight.

EXAMPLE 1

32.5 parts of monosodium 2-aminonaphthalene-4,8-disulfonate was dissolved in 160 parts of water containing 8.4 parts of a 47% sodium hydroxide solution. 30 parts of 35% hydrochloric acid, 18 parts of 40% sodium nitrite and ice were then added to the reaction solution, which was agitated at 15°C for 1 hour to produce a diazonium salt suspension. Then, 150 parts of water, 450 parts of sodium chloride, and 17 parts of thiourea were added to the suspension. 12.1 parts of 3-methyl-1-aminobenzene were then further added to the resultant suspension over a period of 1 hour, and a solution containing 10 parts of crystalline sodium acetate and 20 parts of water were added dropwise to the suspension to neutralize same. The neutral suspension was agitated at room temperature overnight, and then heated to 40°C with continuous agitation. When the reaction reached the stage where no unreacted diazonium salt could be detected, the suspension was further heated to 85°C and was agitated at that temperature for 2 hours, during which time the color of the reaction solution changed to violet. 380 parts of sodium chloride were then added to the reaction solution to salt out the dye product. The product was filtered off and dried to obtain a monoazo compound in a yield of 90% and high quality. The monoazo compound thus obtained is an important intermediate for a yellowish direct dye.

Where the above reaction was repeated without using thiourea, it required a longer reaction time (one day) for completion of the coupling reaction, and produced a relatively low quality reaction product and yield.

EXAMPLE 2

17 parts of thiourea were added to a solution which was obtained by tetrazotizing in a conventional manner, 25.4 parts of 4,-4'-diamino-3,3'-dimethyl-1,1'-diphenyl with hydrochloric acid and sodium nitrite. 34.1 parts of monosodium 1-amino-8-hydroxynaphthalene-3,6-disulfonate dissolved in a water and sodium carbonate solution was added dropwise to the resultant solution with vigorous agitation while maintaining a temperature of 5°–10°C, by adding ice as necessary until completion of the coupling reaction. Then, about 47 parts of a 10% sodium carbonate aqueous solution were added dropwise to the reaction solution. The reaction solution made about 1000 parts in total. After neutralization, the pH value of the reaction solution was maintained constant by the addition of a 10% sodium carbonate aqueous solution as necessary with agitation. This first coupling reaction proceeded rapidly with the coupling occurring mainly at the ortho position with respect to the amino group of the monosodium 1-amino-8-hydroxynaphthalene-3,6-disulfonate. After agitation for 2 hours, it was confirmed that no unreacted monosodium 1-amino-8-hydroxynaphthalene-3,6-disulfonate remained in the solution. 41.6 parts of 2-naphthalene-sulfonic acid dispersed in water was then added to the reaction solution as a stabilizer.

A diazo solution obtained by the diazotization of 11.2 parts of 1-aminobenzene, and a solution containing about 70 parts of sodium carbonate in water were added to the first coupling reaction solution. This coupling reaction was conducted at 10°–15°C for 2 hours. 10.8 parts of 1,3-diamino-benzene dissolved in an aqueous solution of sodium carbonate were then mixed with the reaction solutions, and the mixture was agitated for several hours to produce a greenish black trisazo dye. The mixture was heated to 90°C to salt out the dye, which was then filtered off at 100°C at atmospheric pressure and pulverized to form a fine black powder.

The dye product was suitable for imparting a greenish black color to natural and regenerated cellulosic fibers such as cotton, flax, linen, viscose, and a staple fiber such as paper, wool, silk, synthetic ployamides and leather.

The above procedure was repeated twice using urea instead of thiourea in the first run and no promoter in the second run. The results are given in Table 1.

Table 1

Comparison of the Results of the Method of Example 2 Using Thiourea, Urea, and no Promoter

| | Time period required for primary coupling *1 | Amount of promoter used (Per 1000 parts of coupling solution) | Tris Azo Dye Ratio of Yield | Content of secondary Reaction Products | Remarks |
|---|---|---|---|---|---|
| Using Thiourea | 6–7 hours | 17 | 100 | Slight | — |

Table 1—Continued

Comparison of the Results of the
Method of Example 2 Using Thiourea,
Urea, and no Promoter

| | Time period required for primary coupling *1 | Amount of promoter used (Per 1000 parts of coupling solution) | Tris Azo Dye | | Remarks |
| --- | --- | --- | --- | --- | --- |
| | | | Ratio of Yield | Content of secondary Reaction Products | |
| Without using a promoter | More than 15 hours | 0 | 65 | Great | — |
| With use of urea | 10 hours | 330 | 83 | Small | *2 |

*1 "Time period required for primary coupling" means the time period required before adding the stabilizer, 2-naphthalene-sulfonic acid after commencement of the addition of the mono-sodium 1-amino-8-hydroxynaphthalene-3,6-disulfonate aqueous solution to the tetratizing solution of 4,4'-diamino-3,3'-dimethyl-1,1'-diphenyl.
*2 The use of urea encounters various problems discussed in the "Background of the Invention."

EXAMPLE 3

9.4 parts of 3-amino-4-hydroxybenzene-1-sulfonamide was added to a mixture of 80 parts of water and 8 parts of 35% hydrochloric acid. The resultant solution was heated for dissolution and ice was added thereto to cool the solution to 5°C. An aqueous solution containing 3.6 parts of sodium nitrite was then added to the solution which was agitated for 2 hours while maintaining a temperature lower than 5°C to form a diazonium salt. 10 parts of thiourea were then added to the diazonium salt suspension. Then, 16.6 parts of 3-phenylamino-8-hydroxynaphthalene-6-sulfonic acid dissolved in a heated solution containing 200 parts of water and 3 parts of sodium carbonate was added to the diazonium salt-containing suspension. The resultant solution was agitated at room temperature overnight, and was then heated to 70°C at which temperature 11 parts of 48% sodium hydroxide (by which the dye was dissolved) and 72 parts of sodium chloride were added to salt out the reaction product. The product was filtered off and dried to obtain a high purity monoazo compound in an almost quantitative yield.

The monoazo compound is important as an intermediate of a dye. Where the above procedure was repeated without the use of thiourea, the monoazo product was of a poorer quality and the yield was reduced.

EXAMPLE 4

A diazo solution was obtained by reacting 15 parts of 4-acetylamino-1-aminobenzene with a mixture of hydrochloric acid and sodium nitrite in a conventional manner and its pH was adjusted to 1.5. 34.1 parts of monosodium 1-amino-8-hydroxynaphthalene-3,6-disulfonate was suspended in 700 700 parts of water, to which was added dilute hydrochloric acid to adjust the pH value to 1.2. 30 parts of thiourea was then added to the resultant suspension.

The above-described diazonium salt aqueous solution and suspension were mixed. A solution containing 26 parts of sodium acetate in 100 parts of water was added dropwise to the mixture over 2–3 hours. The resultant suspension was agitated overnight at room temperature, and then heated to 90°C after which a monoazo product was filtered off and dried. The product had azo groups coupled in an ortho position with respect to the amino groups. The yield was 81%.

Where the above process was repeated without thiourea, little or no monoazo compound having azo groups coupled in an ortho position with respect to the amino group was obtained.

The invention may be embodied in other specific forms without departing from the spirit or essential characteristics thereof. The foregoing examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a method for the preparation of an azo compound by the coupling of a diazo or tetrazo compound with a coupling component, the improvement which comprises conducting the coupling reaction in the presence of thiourea.

2. The method of claim 1 wherein the coupling reaction is conducted in an aqueous solution containing from about 0.2% to about 10% by weight of said thiourea.

3. The method of claim 1 wherein said coupling is conducted in the presence of a stabilizer for the diazo or tetrazo compound, said stabilizer selected from naphthalene-2-sulfonic acid, xylenesulfonic acid and p-toluenesulfonic acid.

4. A method for the preparation of a trisazo compound having in its free acid form, the general formula:

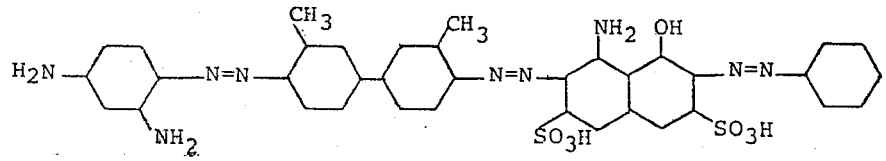

comprising coupling tetrazotized o-tolidine with 1-amino-8-hydroxynaphthalene-3,6-disulfonic acid in an acid medium in the presence of thiourea to form a first intermediate, intermediated, coupling said first azo product with diazotized aniline to form a second azo intermediate, and reacting said second azo intermediate with 1,3-diaminobenzene to form said trisazo compound.

5. The process of claim 1 wherein said coupling component is a carbocyclic coupling component.

* * * * *

UNITED STATES PATENT OFFICE
CERTIFICATE OF CORRECTION

Patent No. 3,915,953   Dated October 28, 1975

Inventor(s) Satoshi Mori; Setsuzo Takahashi; Toru Tabie; Tadashi Esumi; and Yasuhiko Arisaka It is certified that error appears in the above-identified patent and that said Letters Patent are hereby corrected as shown below:

Column 1, line 49, "salt" should read --step--.

Column 3, line 3, before "the" insert --to--.

Column 5, line 59, delete "700" (first occurrance).

Column 6, claim 4, line 61, "intermediate," should read --azo--; "intermediated" should read --intermediate--.

Signed and Sealed this

Seventeenth Day of August 1976

[SEAL]

Attest:

RUTH C. MASON
Attesting Officer

C. MARSHALL DANN
Commissioner of Patents and Trademarks